United States Patent
Waters et al.

(10) Patent No.: US 8,943,252 B2
(45) Date of Patent: Jan. 27, 2015

(54) LATENCY SENSITIVE SOFTWARE INTERRUPT AND THREAD SCHEDULING

(75) Inventors: Bradley M. Waters, Woodinville, WA (US); Danyu Zhu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 175 days.

(21) Appl. No.: 13/587,737

(22) Filed: Aug. 16, 2012

(65) Prior Publication Data

US 2014/0052882 A1 Feb. 20, 2014

(51) Int. Cl.
*G06F 13/24* (2006.01)
*G06F 9/48* (2006.01)

(52) U.S. Cl.
CPC .................... *G06F 9/4843* (2013.01)
USPC ............ 710/267; 710/260; 718/104

(58) Field of Classification Search
CPC . G06F 9/4812; G06F 9/4843; G06F 9/45533; G06F 9/4881; G06F 9/485; G06F 9/50; G06F 9/52; G06F 13/24
USPC ............ 710/260–269; 718/100, 104, 108
See application file for complete search history.

(56) References Cited

U.S. PATENT DOCUMENTS

| | | | |
|---|---|---|---|
| 5,542,035 A | 7/1996 | Kikinis et al. | |
| 5,724,565 A | 3/1998 | Dubey et al. | |
| 7,526,661 B2 | 4/2009 | Nakajima et al. | |
| 7,552,347 B2 | 6/2009 | Schutte | |
| 7,565,562 B2 | 7/2009 | Chary | |
| 7,861,098 B2 | 12/2010 | Theocharous et al. | |
| 7,984,218 B2* | 7/2011 | Suzuki | 710/267 |
| 2002/0138717 A1 | 9/2002 | Joy et al. | |
| 2004/0187120 A1 | 9/2004 | Moore et al. | |
| 2008/0201500 A1 | 8/2008 | Zytaruk et al. | |
| 2009/0172229 A1* | 7/2009 | Zmudzinski | 710/260 |
| 2009/0210888 A1 | 8/2009 | Lee et al. | |
| 2009/0248934 A1 | 10/2009 | Ge et al. | |
| 2009/0249094 A1 | 10/2009 | Marshall et al. | |
| 2009/0307696 A1 | 12/2009 | Vals et al. | |
| 2009/0320031 A1 | 12/2009 | Song | |
| 2009/0328055 A1 | 12/2009 | Bose et al. | |
| 2010/0100755 A1 | 4/2010 | Lin et al. | |
| 2010/0146513 A1 | 6/2010 | Song | |

(Continued)

FOREIGN PATENT DOCUMENTS

EP 2330506 A1 6/2011

OTHER PUBLICATIONS

"International Search Report & Written Opinion for PCT Patent Application No. PCT/US2013/054595", Mailed Date: Dec. 5, 2013, Filed Date: Aug. 13, 2013, 8 pages.

(Continued)

*Primary Examiner* — Glenn A Auve
(74) *Attorney, Agent, or Firm* — John Jardine; Kate Drakos; Micky Minhas

(57) ABSTRACT

Various embodiments provide an ability to schedule latency-sensitive tasks based, at least in part, upon one or more processor cores usage metrics. Some embodiments gather information associated with whether one or more processor cores are in a heavily loaded state. Alternately or additionally, some embodiments gather information identifying latency-sensitive tasks. Task(s) can be (re)assigned to different processor core(s) for execution when it has been determined that an originally assigned processor core has exceeded a usage threshold.

20 Claims, 10 Drawing Sheets

(56) References Cited

U.S. PATENT DOCUMENTS

| | | | |
|---|---|---|---|
| 2010/0153954 A1 | 6/2010 | Morrow et al. | |
| 2011/0039508 A1 | 2/2011 | Lindahl et al. | |
| 2011/0055838 A1 | 3/2011 | Moyes | |
| 2011/0072180 A1* | 3/2011 | Lee | 710/260 |
| 2011/0163976 A1 | 7/2011 | Barnhoefer et al. | |
| 2011/0296212 A1 | 12/2011 | Elnozahy et al. | |
| 2012/0284543 A1 | 11/2012 | Xian et al. | |
| 2012/0284729 A1 | 11/2012 | Sharda et al. | |
| 2013/0080674 A1* | 3/2013 | Veal et al. | 710/268 |
| 2013/0179616 A1* | 7/2013 | Accapadi et al. | 710/269 |

OTHER PUBLICATIONS

"Intel® Centrino® Duo Mobile Technology", *Retrieved from*: <http://www.intel.com/technology/itj/2006/volume10issue02/art03_power_and_thermal_management/p03_power_management.htm> on Feb. 3, 2011, Intel Technology Journal, vol. 10, Issue 2,(May 15, 2006), 7 pages.

"The Science of Sleep", *Microsoft Corporation*, http://www.google.com/url?sa=t&source=web&cd=1&ved=0CBUQFjAA&url=http%3A%2F%2Fdownload.microsoft.com%2Fdownload%2F3%2F0%2F2%2F3027D574-C433-412A-A8B6-5E0A75d5B237%2FScience-Sleep.docx&ei=3RZJTYabAs-M4QbNkYTTCw&usg=AFQjCNFvlto3_4PLczFqBjpL9FzssQI5NA,(Jun. 16, 2010), pp. 1-14.

Cota-Robles, Erik et al., "A Comparison of Windows Driver Model Latency Performance", *3rd Symposium on Operating Systems Design and Implementation* New Orleans, Louisiana, Available at <http://static.usenix.org/events/osdi99/full_papers/cota/cota.pdf>,(Feb. 1999), 15 pages.

Heath, Taliver et al., "Application-Supported Device Management for Energy and Performance", *In Proceedings of the Workshop on Power-Aware Computer Systems*, http://www.google.com/url?sa=t&source=web&cd=3&ved=0CCQQFjAC&url=http%3A%2F%2Fwww.cs.rutgers.edu%2F~ricardo%2Fpapers%2Fpacs02.ps.qz&ei=KpBKTfWxL17n4AbLkLCYDA&usg=AFQjCHMyUw3yJ8BCCdRaCQbF_00O7RRfg,(2002), pp. 1-11.

Klee, Christoph "Design and Analysis of Energy-Aware Scheduling Policies", *Dissertation, University of Karlsruhe, Institute for Operating and Dialog Systems*, Available at <http://os.ibds.kit.edu/downloads/da_2008_klee-christoph_energy-aware-scheduling-policies.pdf>,(Aug. 20, 2008), 90 pages.

Roodyn, Neil "Mobile PC Power Management", Retrieved from: <http://msdn.microsoft.com/en-us/library/ms812491.aspx> on Feb. 4, 2011, (Jun. 2005), 14 pages.

Saxe, Eric "Power Optimized Thread Placement", Retrieved from: <http://blogs.sun.com/esaxe/entry/power_optimized_thread_placement> on Feb. 3, 2011, (Mar. 30, 2009), 3 pages.

Singh, Karan et al., "Real Time Power Estimation and Thread Scheduling via Performance Counters", *ACM SIGARCH Computer Architecture News*, vol. 37, Issue 2, Available at <http://www.csl.cornell.edu/~major/dascmp08.pdf>,(May 2009), pp. 1-10.

Winter, Jonathan A., et al., "Scalable Thread Scheduling and Global Power Management for Heterogeneous Many-Core Architectures", *In Proceedings of PACT 2010*, Available at <http://www.csl.cornell.edu/~albonesi/research/papers/pact10_2.pdf>,(Sep. 2010), 11 pages.

"Non-Final Office Action", U.S. Appl. No. 13/099,660, Jan. 16, 2014, 12 pages.

"Final Office Action", U.S. Appl. No. 13/099,660, Oct. 23, 2013, 12 pages.

"Non-Final Office Action", U.S. Appl. No. 13/099,660, (Jul. 8, 2013),11 pages.

"Final Office Action", U.S. Appl. No. 13/099,660, Mar. 31, 2014, 10 pages.

"Non-Final Office Action", U.S. Appl. No. 13/099,077, May 23, 2014, 9 pages.

"Restriction Requirement", U.S. Appl. No. 13/099,077, Apr. 1, 2014, 6 pages.

"Final Office Action", U.S. Appl. No. 13/099,077, Sep. 5, 2014, 11 pages.

* cited by examiner

LATENCY SENSITIVE SOFTWARE INTERRUPT AND THREAD SCHEDULING

BACKGROUND

Computing devices today have the ability to multi-task on many levels. For example, a user of a computing device can have multiple applications running simultaneously while entering input from multiple input devices (keyboard, touch screen, mouse, etc.). Subsequently, each of these applications, input devices, and so forth, vie for a processor's time. The associated computing device and/or processor can manage the multi-tasking in several ways, such as by prioritizing and/or splitting time between those requesting access to the processor. For instance, the computing device can assign priority rankings to applications and/or threads, and distribute access to the processor according to the priority ranking. This ensures that those requesting access to the processor will eventually receive an allotment of time on the processor. Sometimes, however, a requesting task has more urgent or time-sensitive needs. In these cases, a requesting application and/or thread can be set with a higher priority than a currently running thread, thus causing the currently running thread to be pre-empted. Alternately, devices request processor time through an interrupt mechanism, such as a physical hardware interrupt or a software interrupt.

When a processor receives an interrupt, the task currently being executed by the processor is typically suspended in order to service the interrupt. Consider a simplified case where an application has temporary ownership of the processor to update a display with an image, and a user decides to enter a mouse click or touch screen input during the display update as a means to pre-emptively zoom in on the image. Generally speaking, the mouse click generates an interrupt to the processor as a notification of the clicking activity. Upon receiving the interrupt, the processor temporarily suspends activity associated with the application in order to service the interrupt, and resumes the suspended activity after completing an interrupt service routine. More often than not, this transaction occurs with little to no perceivable difference to the user. However, some applications and/or tasks are more time sensitive to being suspended. In these cases, if the application and/or task has not been resumed in a timely manner, the user may notice a lag in execution, and subsequently perceive the computing device as underperforming or malfunctioning.

SUMMARY

This Summary is provided to introduce a selection of concepts in a simplified form that are further described below in the Detailed Description. This Summary is not intended to identify key features or essential features of the claimed subject matter.

Various embodiments provide an ability to schedule latency-sensitive tasks based, at least in part, upon one or more processor cores usage metrics. Some embodiments gather information associated with whether one or more processor cores are in a heavily loaded state. Alternately or additionally, some embodiments gather information identifying latency-sensitive tasks. In certain cases, task(s) and/or interrupts can be (re)assigned to different processor core(s) for execution when it has been determined that an originally assigned processor core has exceeded a usage threshold.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Various embodiments provide an ability to schedule latency-sensitive tasks based, at least in part, upon processor core usage metrics. One or more processor cores associated with a given system can be configured to identify when a particular processor core's usage has exceeded a certain threshold, when the processor core is busy processing interrupts, and so forth. Alternately or additionally, these metrics can be periodically gathered and/or updated to identify times when processor cores in a given system are more heavily loaded than others, and/or times in which processor core resources are relatively free for use. Prior to assigning a task to a processor core, such as assigning software interrupt and/or scheduling a latency-sensitive thread to a particular processor core for processing, the metrics can be analyzed to determine which processor core currently has more resources available for the task. In turn, the task can complete efficiently by running without being suspended. In addition to analyzing processor core metrics, some embodiments can determine characteristics of a task, such as whether the task is latency-sensitive. The task characteristics can be analyzed in combination with the processor core metrics, and/or separately, to determine whether the task is to be (re)assigned to different processor core(s) for execution.

In the discussion that follows, a section entitled "Example Operating Environment" is provided and describes one environment in which one or more embodiments can be employed. Following this, a section entitled "Scheduling Latency-Sensitive Tasks" describes how latency-sensitive tasks can be assigned and/or reassigned to processor core(s) in a system that are more available than other CPU(s). Last, a section entitled "Example Device" describes an example device that can be utilized to implement one or more embodiments Having provided an overview of various embodiments that are to be described below, consider now an example operating environment in which one or more embodiments can be implemented.

Example Operating Environment

Figure 1:
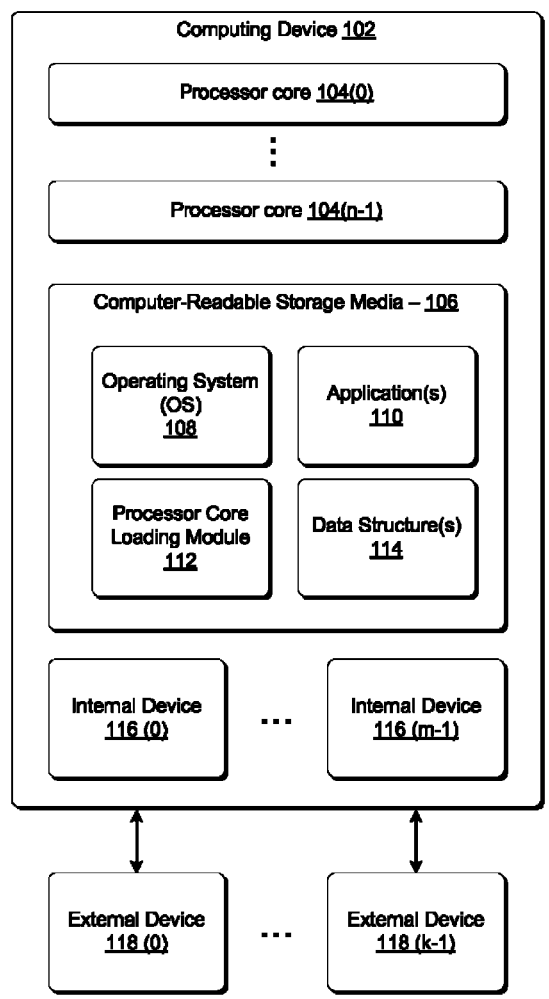
FIG. 1 is an illustration of an example implementation in accordance with one or more embodiments.

FIG. 1 is an illustration of an example implementation that is operable to employ the techniques described in this document. The illustrated example includes computing device 102 that may be configured in a variety of ways. For example, computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth. Thus, computing device 102 may range from full resource devices with substantial memory and processor resources (e.g., personal computers, game consoles) to a low-resource device with limited memory and/or processing resources (e.g., traditional set-top boxes, hand-held game consoles). Computing device 102 also includes software that causes computing device 102 to perform one or more operations as described below.

Among other things, computing device 102 includes processor core(s) 104. In this particular example, computing device 102 includes "n" processor cores, signified here by the notation 104(0)-104(n−1). Each processor core 104 represents functionality that can execute machine-level processor instructions, such as branch, jump, add, subtract, move data, and so forth. Alternately or additionally, each processor core 104 is configured to execute processor instructions in parallel with the other processor cores associated with computing device 102. While illustrated in FIG. 1 as separate modules, it is to be appreciated that a single hardware module can be configured to include multiple processor cores. For example, in some embodiments, computing device 102 can include a dual-core processor (e.g. a single hardware processor unit that includes two processor cores 104), a quad-core processor (e.g. a single hardware processor unit that includes four processor cores 104), and so forth. Alternately or additionally, computing device 102 can include multiple hardware modules, each of which contain multiple processor cores. Thus, computing device 102 can include multiple processor core(s) 104 in any suitable hardware configuration.

Computing device 102 also includes one or more computer-readable storage media 106. The computer-readable storage media can include, by way of example and not limitation, all forms of volatile and non-volatile memory and/or storage media that are typically associated with a computing device. Such media can include ROM, RAM, flash memory, hard disk, removable media and the like. Among other things, computer-readable storage media 106 includes one or more operating system (OS) module(s) 108, one or more application(s) 110, processor core loading module 112, and one or more data structure(s) 114.

Operating system (OS) module(s) 108 represent, among other things, functionality configured to manage software and/or hardware resource(s) of computing device 102. This can be done in any suitable manner, such as one module or several modules working in concert. In some embodiments, operating system module(s) 108 include functionality related to handling and/or managing generation and/or servicing of software and/or hardware interrupts.

Application(s) 110 represent one or more applications comprising instructions that can be executed by any combination of processor core(s) 104(0)-(n−1). Application(s) 110 can include high level application(s) with functionality to interact with a user of computing device 102, can include processor core instructions associated with a software thread, and/or can include instructions associated with low level application(s) that interact with low-level and/or rudimentary aspects of computing device 102, such as driver software, interrupt service routines, and so forth. Alternately or additionally, application(s) 110 can access and/or utilize functionality provided by operating system 108. Thus, computing device 102 can include a wide range of application(s).

Processor core loading module 112 represents functionality that can assign and/or reassign task(s) to processor core(s) 104(0)-(n−1), such as (re)assigning one or more application(s) 110. While illustrated in FIG. 1 as a separate module from operating system module(s) 108, it is to be appreciated and understood that processor core loading module 112 could be included as a part of operating system module(s) 108 without departing from the scope of the claimed subject matter. In some cases, processor core loading module 112 can assign a task to one or more processor cores based upon characteristics of the processor core. Alternately or additionally, processor core loading module 112 can (re)assign a task to one or more processor core(s) based upon characteristics of the task being assigned, as further described below. This includes gathering data to identify how "loaded" or "busy" a processor core is at a given moment in time, and/or assigning tasks to various processor cores as a means to more evenly distribute processing workloads on computing device 102.

Data structure(s) 114 represent one or more data structures that contain information, such as flags, numbers, strings, etc. In some embodiments, some data structure(s) 114 can include information describing characteristics associated one or more processor core(s). Alternately or additionally, some data structure(s) 114 can include information associated with one or more application(s) 110, operating system module(s) 108, and/or processor core loading module 112. In either and/or both cases, data structure(s) 114 can store information in any suitable format that can be used to convey any suitable characteristic associated, such as a processor speed, a processor core loading percentage, a processor core heavily loaded state flag, whether an application includes time-sensitive characteristic(s), timing measurements, and so forth.

Computing device 102 also includes one or more internal device(s) 116, and has one or more attached external device(s) 118. In this example, the plurality of internal and/or external devices are indicated using the notation of m−1 and k−1, where "m" indicates the number of internal devices and "k" indicates the number of attached external devices. Among other capabilities, internal device(s) 116 and external device(s) 118 include an ability to interrupt and/or request task execution on processor core(s) 104, such as an interrupt service routine. While FIG. 1 illustrates "m" and "k" as having value greater than one, it is to be appreciated and understood that computing device could simply include either one internal device, and/or one external device without departing from the scope of the claimed subject matter.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

Having described example operating environments in which various embodiments can be utilized, consider now a discussion of scheduling latency sensitive tasks in accordance with one or more embodiments.

Scheduling Latency-Sensitive Tasks

Typically today, computing devices include multi-tasking capabilities, such as running multiple applications in parallel, monitoring input from multiple devices in parallel, and so forth. As technology advances, a user not only expects a computing device to support multi-tasking, but additionally expects seamless performance from the computing device while multi-tasking. This implies that a user has an expectation to run several applications in parallel, and smoothly switch between functioning applications. When multi-tasking is not performed seamlessly, a user may perceive glitches and/or stalls in how the application(s) execute. To enable more robust performance, some computing devices contain multiple processor cores as one way to facilitate multi-tasking and/or parallel processing. However, some processor cores in a given system can become more heavily loaded at times than others. Without monitoring how loaded processor cores are in a system, tasks can get stalled in execution when assigned to the more heavily loaded processor core(s).

Figure 2A:
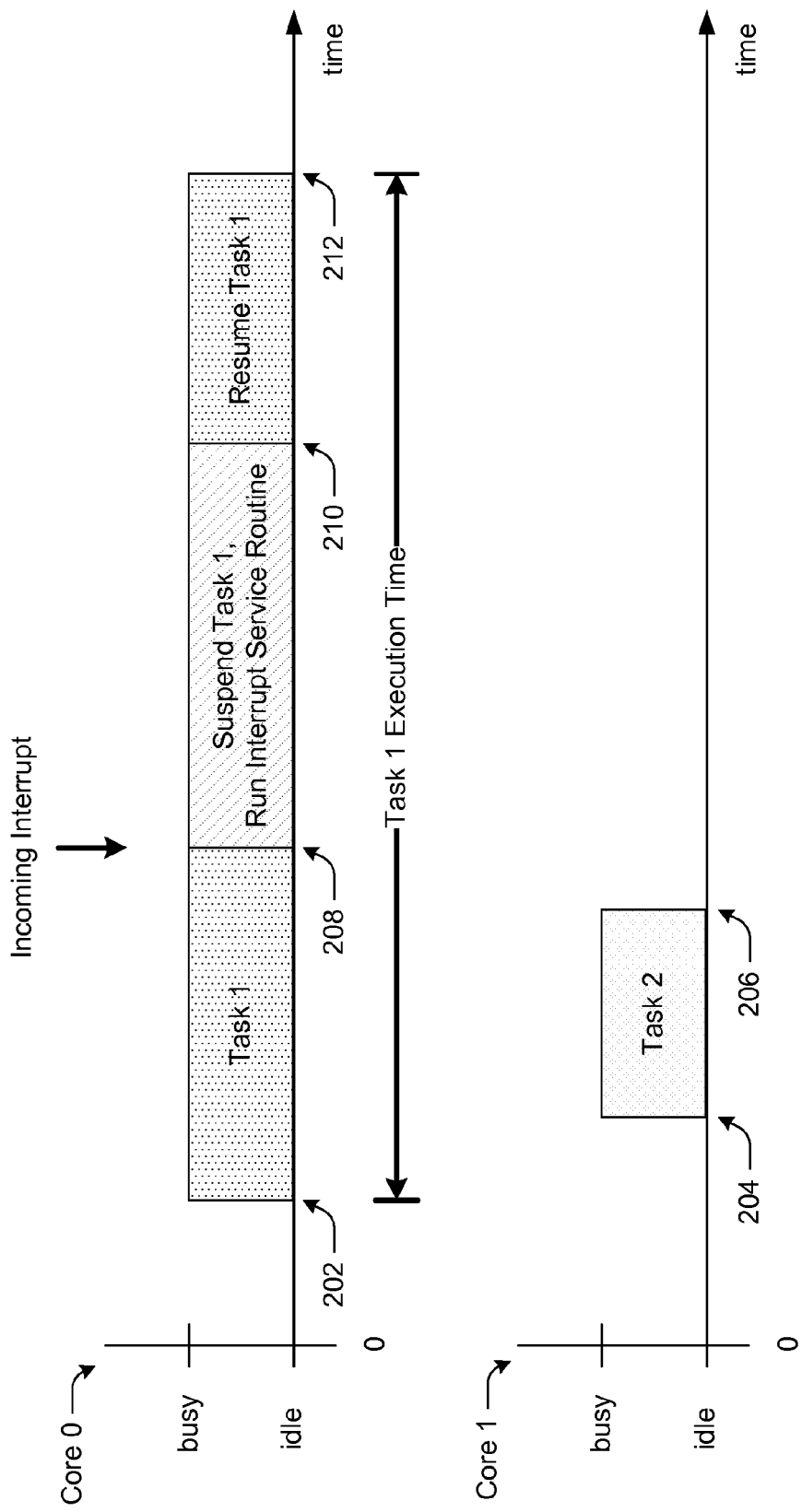
FIGS. 2a-d are illustrations of timing diagrams in accordance with one or more embodiments.
Figure 2B:
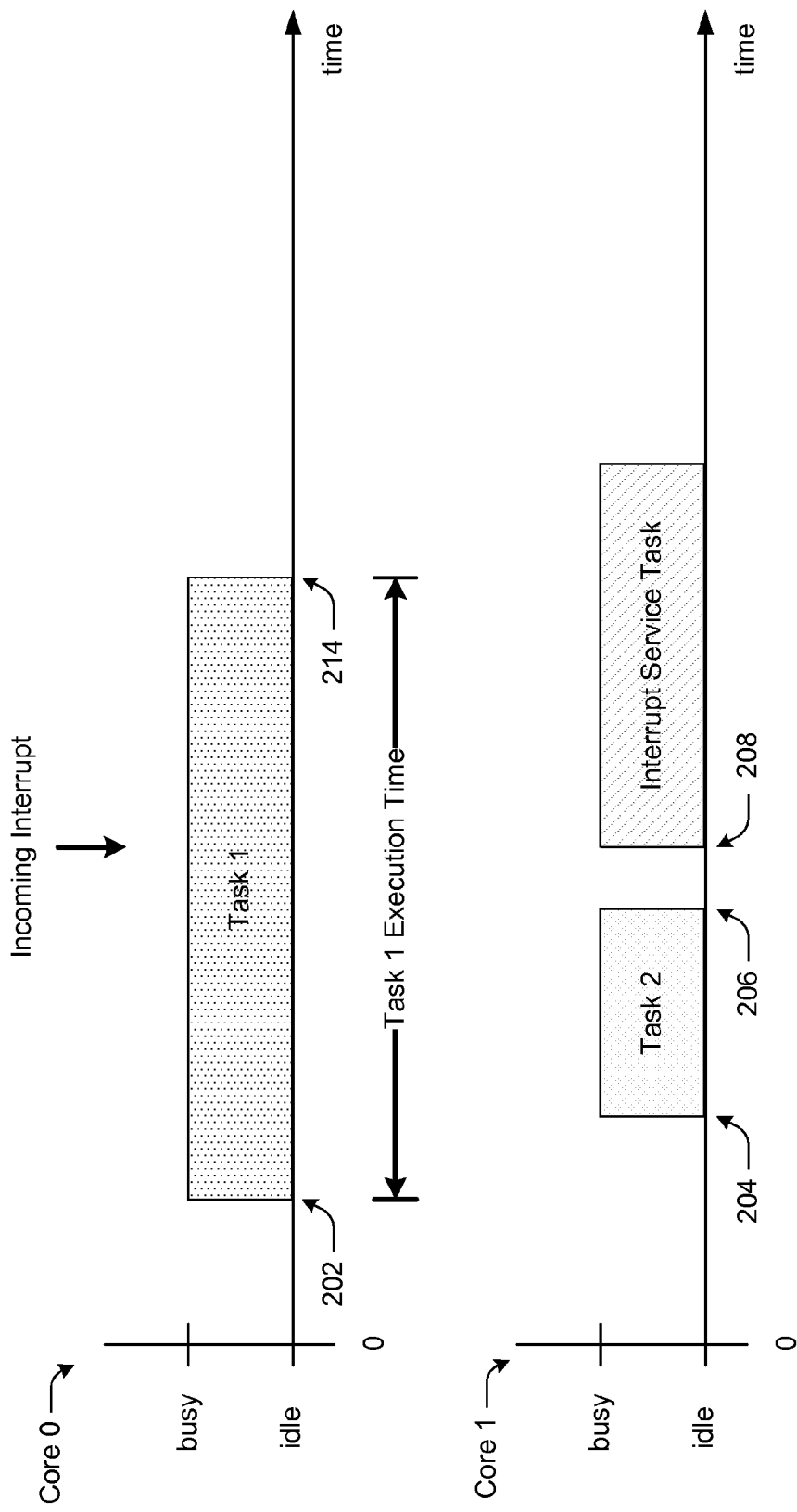

As an example, consider FIGS. 2a-d, which illustrate timing diagrams of multiple processor cores of a computing device multi-tasking between several tasks and/or applications as discussed above. These illustrations capture timing diagrams associated with "core 0" and "core 1" of a computing device, such as computing device 102 of FIG. 1. While these examples illustrate two processor cores, it is to be appreciated and understood that concepts described in relation to FIGS. 2a-d can be applied to any number of processor cores without departing from the scope of the claimed subject matter. For the sake of brevity, these diagrams illustrate a core as simply being "busy" or "idle". However, other embodiments can distinguish how busy a processor core is to a finer granularity (i.e. a processor core is 45% busy), and so forth. FIGS. 2a and 2b discuss example timing diagrams with respect to scheduling a software interrupt, while FIGS. 2c and 2d describe example timing diagrams with respect to scheduling tasks.

For the purposes of this discussion, FIG. 2a illustrates core 0 and core 1 as being idle at time 0, where time 0 represents an arbitrary beginning point in time. While each core is illustrated here as being idle at time 0, it is to be appreciated that one and/or both of the cores could alternately be busy processing instructions instead. At point 202, core 0 begins processing and/or executing task 1, and transitions to a "busy" state. Task 1 represents any suitable set of processor core instructions, such as a thread, application, grouping of processor core instructions, and so forth. In some cases, task 1 can additionally have an assigned prioritization that ranks task 1's priority of access to a processor core relative to other tasks. For example, a task with higher priority relative to task 1 can potentially preempt and/or temporarily suspend task 1 from access to core 0.

At point 204, core 1 begins processing task 2, and completes processing task 2 at point 206. As in the case of task 1, task 2 can be any suitable grouping of processor instructions, with ranking and/or prioritizations as discussed above. It can also be observed that between the time at point 204 and point 206, both core 0 and core 1 are actively engaged processing tasks in parallel. Upon completing task 2, core 1 has no other task assignment, and transitions to an "idle" state.

At point 208, an incoming interrupt is detected and assigned to run on core 0. Here, core 0 has been pre-identified and/or assigned to process the incoming interrupt. Since task 1 has not run to completion, it is temporarily suspended on core 0, and an interrupt service routine is run instead. Here, the incoming interrupt is serviced by core 0 during an amount of time marked from point 208 to point 210. This length of time represents an arbitrary duration of time. Thus, a preempting task, illustrated here as the interrupt service routine associated with the incoming interrupt, can potentially take nanoseconds, microseconds, milliseconds, seconds, and so forth, to execute. When the preempting interrupt service routine has completed (illustrated here at point 210), the interrupt has been serviced and core 0 resumes processing task 1 to completion at point 212. Thus, the total perceived execution time of task 1 can be calculated as the time between point 202 and point 212. Depending upon the duration of time it takes to complete the interrupt service routine between points 208 and 210, a user may notice delay in task 1's execution, especially if task 1 has time-sensitive characteristics. It can additionally be noted that core 1 remains idle and unused between times 208 and 210. Some embodiments can identify when one processor core is more heavily loaded than another, and (re)assigned tasks to different processor cores accordingly.

Consider FIG. 2b, which illustrates an alternate timing diagram of how tasks can be reassigned to different processor cores. As in the case of FIG. 2a, FIG. 2b includes an observation of processor cores 0 and 1 at arbitrary start time 0. Core 0 begins processing task 1 at point 202, while core 1 begins and completes processing task 2 at points 204 and 206 respectively. Upon completing task 2, core 1 transitions to an "idle" state, while core 0 continues to be busy processing task 1. As also described in the case of FIG. 2a, incoming interrupt is detected at point 208. However, in this case, additional considerations are given in order to assign the interrupt service task to a processor core that is "idle", or less loaded.

When assigning and/or scheduling a task to a processor core, some embodiments schedule the tasks based, at least in part, upon processor core(s) usage metrics. For example, when the incoming interrupt is detected in FIG. 2b, core 0 is busy processing task 1 while core 1 sits idle. Some embodiments monitor when a processor core is busy and/or idle, and (re)assign tasks based upon this metric. Here, since core 0 has been identified as being busy, the interrupt service task is (re)assigned to core 1. This allows the associated computing device to more efficiently process tasks on a whole. By (re)assigning the interrupt service task to core 1, not only is the interrupt service task immediately executed, but the computing device can continue to execute task 1 on core 0 in parallel. Here, the total execution time of task 1 can be measured between starting point 202 and ending point 214. When comparing FIG. 2a to FIG. 2b, it can be noted that all tasks have completed sooner using the discussed techniques employed in FIG. 2b than the tasks illustrated in FIG. 2a.

Figure 2C:
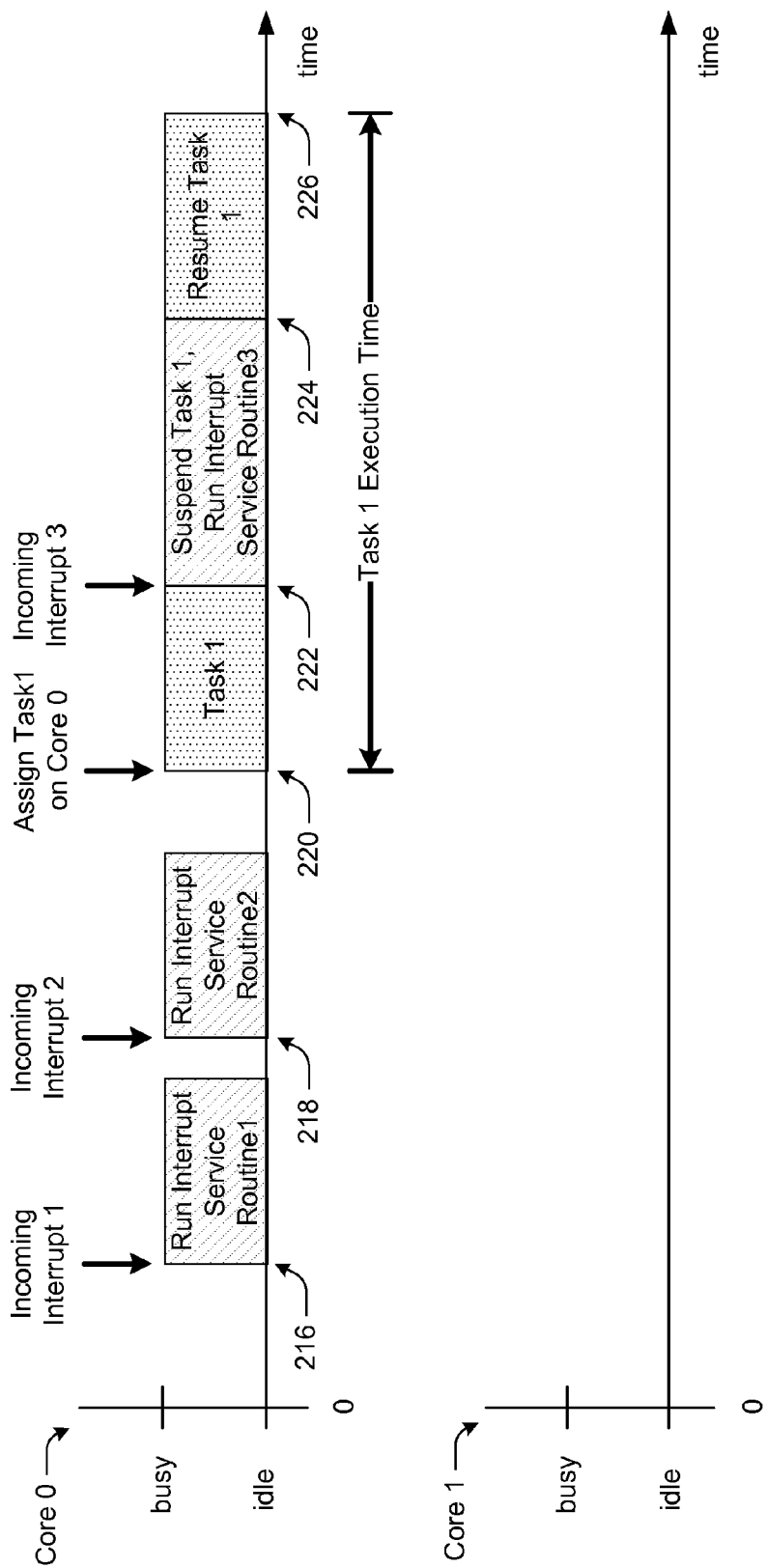

Now consider FIG. 2c, which illustrates processor core 0 processing an interrupt and/or interrupt service routine 1 starting at point 216. Similar to that discussed above, point 216 represents an arbitrary point in time. Interrupt service routine 1 completes and, upon completion, another interrupt is detected at point 218, which causes interrupt service routine 2 to run. In some embodiments, this rapid succession of interrupts and/or interrupt processing can be identified and further cause processor core 0 to be classified as being "busy" and/or "interrupt heavy". While this example uses two interrupts as classifying a processor core as being "busy" and/or "interrupt heavy", it is to be appreciated and understood that any number of interrupts occurring at any rated can be used as a threshold for this classification without departing from the scope of the claimed subject matter. At point 220, task 1 is assigned and/or scheduled to run on processor core 0, and begins execution. During the execution of task 1, a third interrupt is detected at point 222. Here, task 1 is suspended, and processor core 0 begins processing an interrupt service routine associated with the third interrupt. At point 224, interrupt service routine 3 completes, and task 1 resumes until its completion at point 226. Thus, the perceived execution time of task 1 can be measured as the time between points 220 and point 226, and also includes processing time for interrupt service routine 3, shown here to be the time between points 222 and 224. Assuming task 1 is not latency-sensitive, this delay may be insignificant and/or imperceptible to a user.

However, if task 1 is a latency-sensitive task, the delay between point 222 and point 224 (and subsequently when task 1 runs) can potentially be noticed by the user. It can also be noted that during this time, core 1 is in an idle state and/or is not currently busy processing any instructions.

Figure 2D:
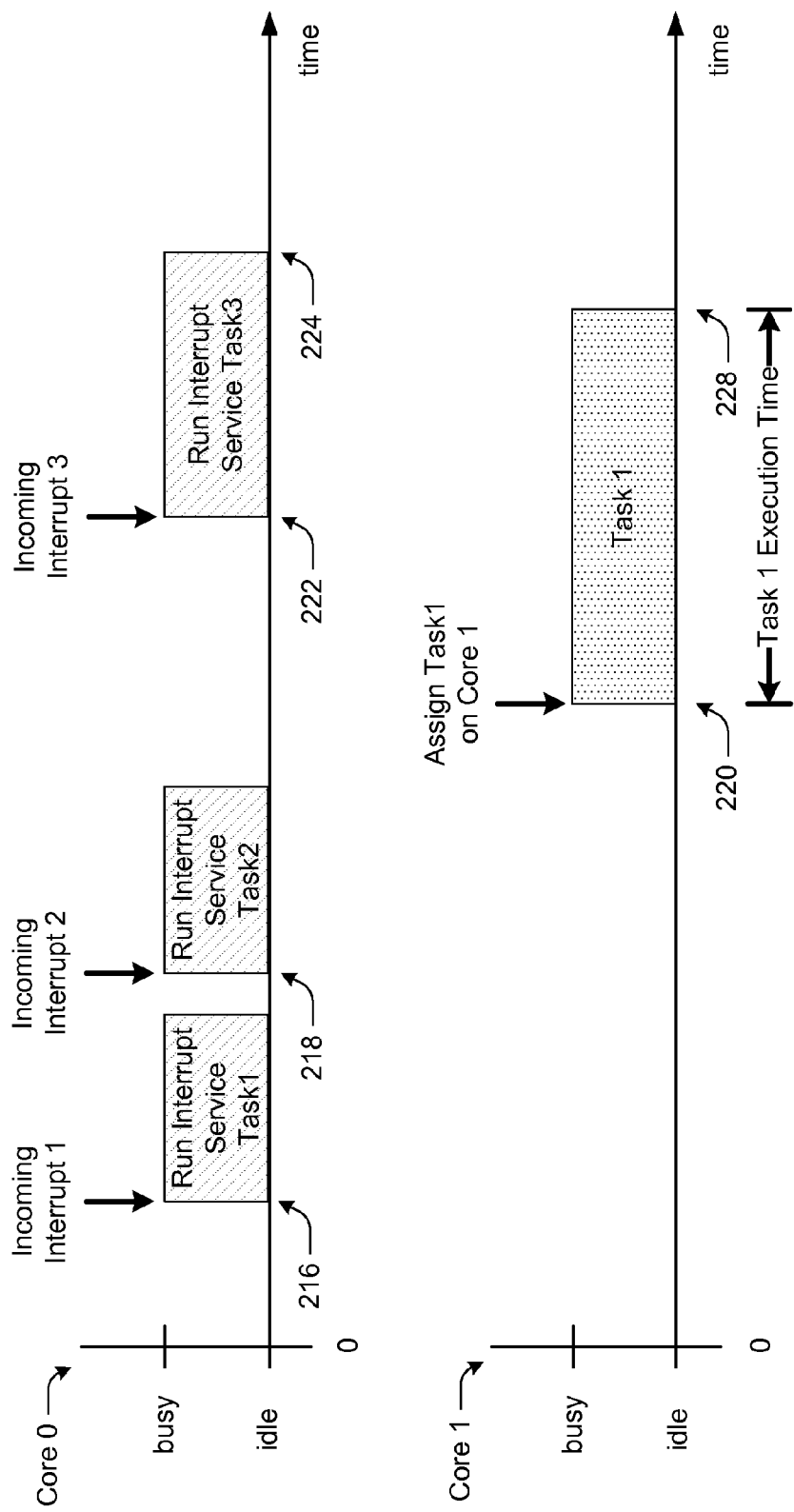

FIG. 2d illustrates an alternate embodiment where characteristics associated with the processor core(s) and tasks are considered when scheduling task 1. As in the case of FIG. 2c, processor core 0 begins processing interrupt service routine 1 at point 216, and interrupt service routine 2 at point 218, thus classifying processor core 0 as being in an "interrupt heavy" and/or "busy" state, as further discussed above. At point 220, scheduling of task 1 begins. In this example, the scheduling process takes into consideration processor core 0's state and/or classification as being "busy". Alternately or additionally, the scheduling process can identify characteristics of task 1 that impact what processor core task 1 is assigned to. In this example, task 1 has been identified as a latency-sensitive task and processor core 0 has been identified as being in the "busy" and/or "interrupt heavy state". In response to these identifications, the scheduling process assigns task 1 to processor core 1 instead of processor core 0. Subsequently, when interrupt 3 comes in at point 222 and completes at point 224, it does not affect the execution time of task 1. Instead, task 1 continues its execution uninterrupted, and completes at point 228, thus eliminating any outside delay in task 1's execution time, illustrated here as being between points 220 and 228.

While the preceding examples describes scheduling a generic task and/or an interrupt service task to different cores based on processor core usage, any suitable combination and/or types of tasks can be scheduled. Alternately or additionally, tasks can be scheduled based upon a task metric, such as whether the task is latency-sensitive, which processor core the task last ran on, and so forth. For example, an input and/or task associated with a touch screen may have a metric identifying it as a latency-sensitive task, while a screen-saver task may have a metric identifying it as not being latency-sensitive. Accordingly, the input and/or task may get (re) assigned to an idle or less busy processor core based upon this identification, while the screen-saver task is not (re)assigned. In some embodiments, tasks are scheduled based upon a system goal and/or metric, such as total processor core(s) usage. In any case, scheduling algorithms utilize information that characterizes various aspects of a computing device.

Figure 3:
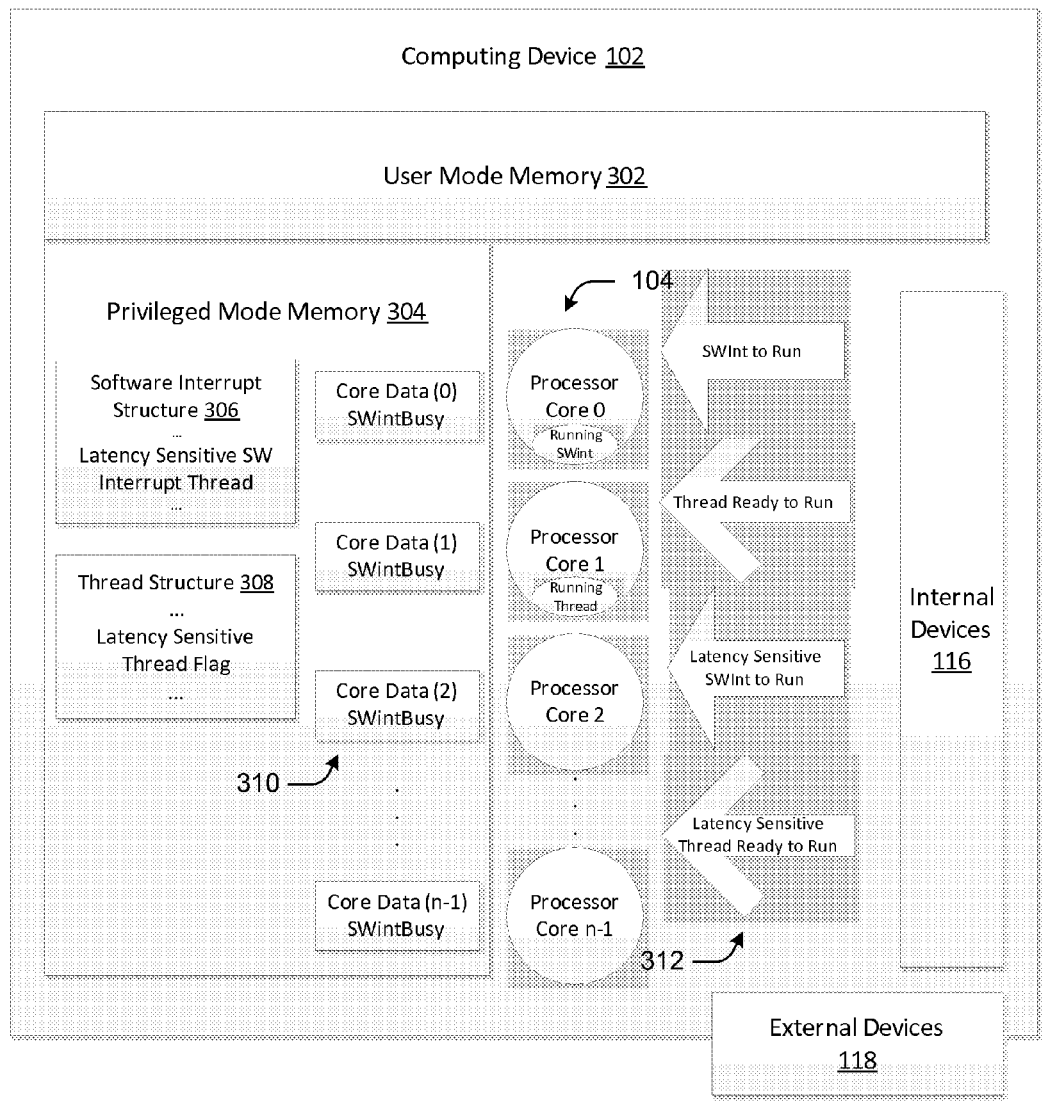
FIG. 3 is an illustration of an example implementation in accordance with one or more embodiments.

FIG. 3 illustrates an example computing device 102 in accordance with one or more embodiments. More particularly, FIG. 3 illustrates a detailed view of computing device 102 as described in FIG. 1. As illustrated in FIG. 1, computing device 102 includes processor core(s) 104, internal device(s) 116, and attached external device(s) 118. Other aspects of computing device 102 described relative to FIG. 1 have been removed for the sake of brevity of this discussion.

Computing device 102 includes user mode memory 302 and privileged mode memory 304. User mode memory 302 represents a memory space that is primarily dedicated for usage by user mode applications and/or applications with limited-to-no direct access to system resources associated with computing device 102. Conversely, privileged mode memory 304 represents a memory space primarily dedicated to system applications and/or sensitive information with restricted access. Among other things, privileged mode memory 304 contains several different data structures including, by way of example and not limitation, software interrupt structure(s) 306, thread structure(s) 308, and core data structure(s) 310.

Software interrupt structure(s) 306 represents one or more structures associated with one or more software interrupts. This structure can include any suitable type and amount of data, such as flag(s), pointer(s) of varying kinds (array pointers, function pointers, class pointers, and so forth), text, number values, Boolean values, etc. In this example, software interrupt structure 306 includes a "Latency Sensitive SW (software) Interrupt Thread" flag that can be used to indicate whether the associated software interrupt task is latency sensitive or not. For example, a value of "1" or "true" can indicate that task is latency sensitive, and a value of "0" or "false" can indicate that the task is not latency sensitive. In some embodiments, this structure can be created when an associated interrupt and/or Deferred Procedure Call (DPC) structure is created. Each software interrupt task can, in some cases, have an associated, dedicated software interrupt structure assigned to it (e.g. there is a one-to-one correspondence between a software interrupt task and a software interrupt structure 306). Alternately or additionally, a single software interrupt structure can include multiple identifiers, each associated with a software interrupt, and corresponding latency sensitive flags for each identifier. For example, the created structure can be stored in a larger structure configured to provide interrupt information and/or characteristics of an associated computing device.

Similar to software interrupt structure(s) 306, thread structure(s) 308 represents one or more structures associated with one or more tasks. Among other things, thread structure 308 includes a "Latency Sensitive Thread Flag", similar to that described above, that can be used to identify a thread as being latency sensitive or not. It is to be appreciated and understood that thread structure(s) 308 can include various amounts of data in various forms, as also described above. In some embodiments, this structure can be created when the associated task and/or thread is created and be set to default values unless otherwise specified at creation time. Privileged mode memory 304 can include a unique thread structure 308 for each identified thread (e.g. multiple thread structure(s) 308) and/or have one thread structure 308 that includes multiple thread identifiers and corresponding latency sensitive flags.

Core data structure(s) 310 represent one or more structures associated with a processor core. As discussed above, core data structure 310 can be associated with one processor core, or multiple processor cores. In this example, there is a one-to-one correspondence between processor core(s) 104 and core data structure(s) 310. Thus, processor core 104 (0) has a corresponding core data structure 310 (0), processor core 104 (1) has a corresponding core data structure 310 (1), and so forth. Included in core data structure(s) 310 is a flag, here represented as a "SWIntBusy" flag, which can be used to indicate whether an associated processor core is busy processing a software interrupt or not.

The combination of the above described data structures can be used to determine how to appropriate tasks amongst multiple processor cores. This, in turn, can lead to better performance of a computing device as perceived by a user. For example, consider processor core(s) 104 as illustrated in FIG. 3. At this capture in time, processor core 0 is illustrated as being busy running a software interrupt, processor core 1 is illustrated as being busy running a thread, and processor cores 2 through n–1 are illustrated as being idle. Computing device 102 also includes tasks 312, which are ready to run and/or are vying for access to a processor core. Here, the term "task" is utilized in a generic sense, and can be used to convey something as complex as an organized software application and/or thread, to something as simple as a grouping of machine level instructions, or any collection of machine level instructions in-between. Alternately or additionally, a task can be invoked and/or identified in any suitable manner, including through hardware notifications and/or software notifications, such as through internal devices 116 and/or external devices 118. In FIG. 3, tasks 312 have been illustrated to include four tasks: a software interrupt (SWInt) to run, a thread ready to run, a latency sensitive SWInt to run, and a latency sensitive thread ready to run. It is to be appreciated and understood that any number of tasks can be identified without departing from the scope of the claimed subject matter.

Some embodiments analyze information prior to assigning tasks and/or machine-level instructions to a processor core, such as the information contained in software interrupt structure(s) 306, thread structure(s) 308, and/or core data structure(s) 310. In this example, software interrupt structure(s) 306 can be analyzed to determine that the first (topmost as illustrated) SWInt to run in tasks 312 is not latency sensitive, while the second SWInt (third from top as illustrated) is latency sensitive. Similarly, thread structure(s) 308 can be analyzed to determine that the first thread ready to run (second from top as illustrated) is not latency sensitive, while the second thread ready to run is (bottom action as illustrated). While this discussion characterizes the tasks and/or actions in terms of being latency sensitive or not, it is to be appreciated and understood that other characterizations of a task and/or action can be utilized in a similar manner.

Upon identifying characterization(s) associated with the one or more tasks, some embodiments further determine information and/or characterizations associated with one or more processor cores, such as through analyzing core data structure(s) 310. The information contained in core data structure(s) 310 can be used to identify that processor cores 0 and 1 are currently busy running a SWInt and thread, respectively. This information can also be used to identify that processor cores 2 through n−1 are currently idle. Alternately or additionally, some embodiments utilize software interrupt structure 306 to identify whether SWInt running on processor core "0" is latency-sensitive or not. Similarly, thread structure 308 can be used to identify whether the thread running on processor core "1" is latency-sensitive or not, what prioritization the running thread has, etc. Thus, it should be noted that a variety of information can be obtained: information characterizing processor core(s), information characterizing task(s) running on a processor core, as well as information characterizing task(s) ready to be assigned to a processor when core. Based on this information, one or more task(s) can be (re)assigned to a processor core. For example, latency-sensitive SWInt and latency-sensitive thread of tasks 312 may have originally been assigned to processor core 0 or 1, but are reassigned to an idle processor core due to either the latency-sensitive nature of the task(s) and/or the busy state of the originally assigned processor core(s). The non-latency sensitive SWInt and/or thread can either be (re)assigned to an idle processor core, or be assigned to a busy processor core in order to keep idle processor core(s) readily available for latency sensitive tasks. Thus, tasks can be (re)assigned to processing core(s) based upon characteristics of not only the tasks, but characteristics of the processing core(s), and what the processing core(s) might be currently running as well (e.g. interrupt, task, etc.).

It should be noted that FIG. 3 illustrates a state of a computing device at a certain capture in time. During this capture time, processor core "0" and processor core "1" are illustrated as being in a busy state, while the other processor core(s) are illustrated as being in an idle state. However, over time the state of processor core(s) can change as they start and complete various tasks. Some embodiments gather and/or maintain information associated with a system state of a computing device, such as when a processor core becomes busy, when a processor core becomes idle, when a processor core is running a high priority task (and/or grouping of machine-level instructions), when a processor core is running an interruptible task, and so forth. This information can be stored in any suitable format, such as the various data structures that discussed with FIG. 3. However, in order to keep an accurate representation of the system state, some embodiments gather information more than once and/or on a continual basis.

Figure 4:
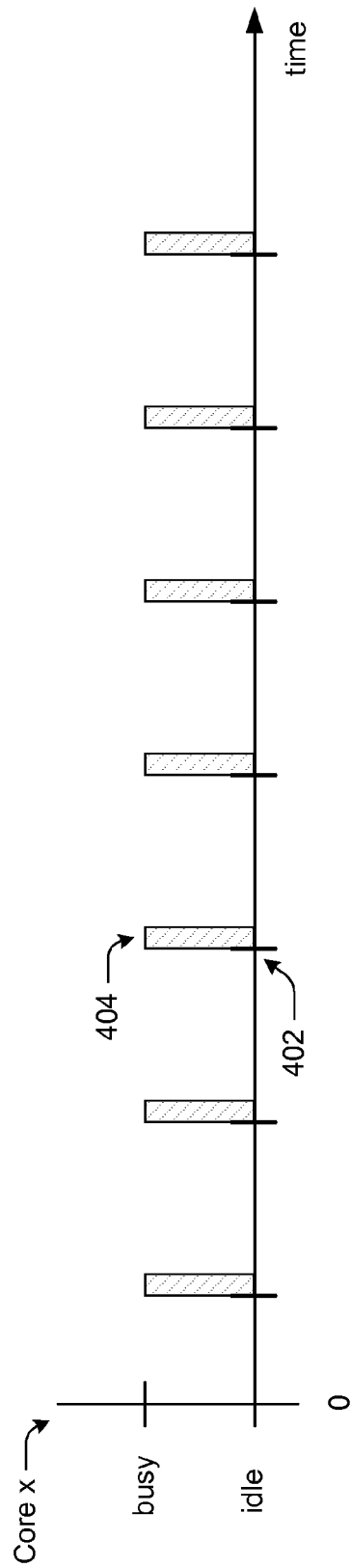
FIG. 4 is an illustration of a timing diagram in accordance with one or more embodiments.

Consider FIG. 4, which illustrates a timeline associated with a processor core. Here, the processor core is referenced as core "x" to indicate the generic nature of which processing core executes this functionality. On the timeline are marked a series of ticks 402. While this series of ticks 402 is illustrated as being periodic in nature, it is to be appreciated and understood that the series of ticks 402 can be aperiodic in nature without departing from the scope of the claimed subject matter. Ticks 402 can be generated in any suitable fashion, such as a clock tick associated with core "x", a programmable timer interrupt, and so forth. Additionally, the time between ticks can be any suitable duration of time, from nanoseconds, microseconds, milliseconds, seconds, etc. Each time a tick occurs, core "x" executes task 404 to gather information associated with the system state, such as whether processor core(s) in the system are busy or idle, whether processor core(s) are processing interrupts, what mode the processor core(s) are running in (interrupt, privileged, user, idle modes), how the processor core is being used, percentage of processor core usage over time, and so forth. In some embodiments, core "x" can be dedicated to maintaining system state information, as illustrated here in FIG. 4. However, other embodiments schedule tasks on core "x" during idle periods.

As part of task 404, some embodiments keep track of how much time a processor core spends executing hardware and/or software interrupts. The time can be measured in any suitable manner, such as in clock cycles associated with the executing processor core, and the like. Alternately or additionally, this time can be compared to a threshold to determine how busy and/or "heavily loaded" a processor core is processing interrupts over time. Similarly, these values can be adjusted as the measured processing time sinks below a given threshold. Thus, depending upon how frequently data is gathered, a fairly accurate representation of the system state can be maintained. Upon determining characteristics of a processor core (e.g. "heavily loaded", busy processing interrupts, idle, and so forth), some embodiments can update and/or store this information, such as the data stored core data structure(s) 310 discussed in FIG. 3. By continuing to gather information repeatedly over time, tasks can be assigned to processor cores based upon current information describing the system state.

Figure 5:
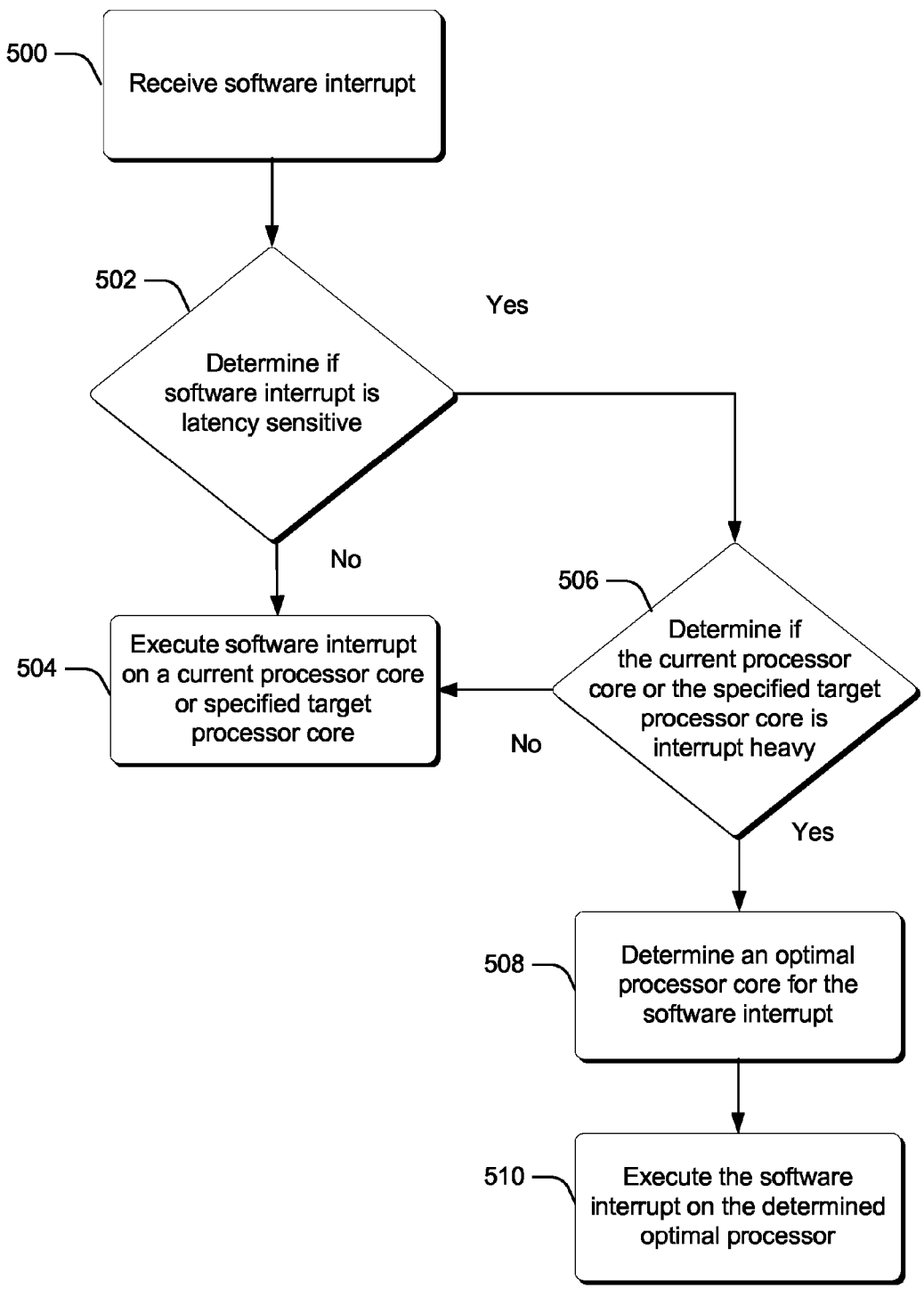
FIG. 5 illustrates a flow diagram in accordance with one or more embodiments.

To further demonstrate, consider FIG. 5, which illustrates a flow diagram that describes steps in a method in accordance with one or more embodiments. The method can be performed by any suitable hardware, software, firmware, or combination thereof. In at least some embodiments, aspects of the method can be implemented by one or more suitably configured software modules executing on one or more computing device, such as processor core loading module 112, of FIG. 1.

Step 500 receives a software interrupt. Responsive to receiving the software interrupt, step 502 determines if the software interrupt is latency sensitive. This can be determined in any suitable manner. For example, the notification of the software interrupt can include a characterization describing whether the software interrupt is latency sensitive. Alternately or additionally, one or more flags in a structure can be analyzed, such as software interrupt structure 306, described in FIG. 3. Responsive to determining the software interrupt is not latency sensitive, step 504 executes the software interrupt on a current processor core or a specified target processor core. The current processor core signifies a processor core that makes the latency sensitive determination. The specified target processor core can be a pre-assigned processor core that may, or may not, be the current processor core, as further described above.

Responsive to determining the software interrupt is the latency sensitive, step 506 determines if the current processor core or specified target processor core is interrupt heavy. This can be determined in any suitable manner, examples of which are provided above. Responsive to determining the current processor core and/or the specified target processor core is not interrupt heavy, the flow process proceeds to step 504 and executes the software interrupt on the current processor core or the specified target core.

Responsive to determining the current processor core or the specified target processor core is interrupt heavy, step 508 determines a desired processor core for the software interrupt. For example, the desired processor core may simply be an idle processor core. Alternate or additionally, the desired processor core can be selected based upon additional characteristics, such as processor speed, last processor core the software interrupt ran upon, power consumption and/or balancing, and so forth. For example, selecting a processor core based upon which processor core last ran the software interrupt and/or task can sometimes improve chances of having relevant date in the processor core cache. Responsive to determining the desired processor core, step 510 executes the software interrupt on the determined processor core.

Figure 6:
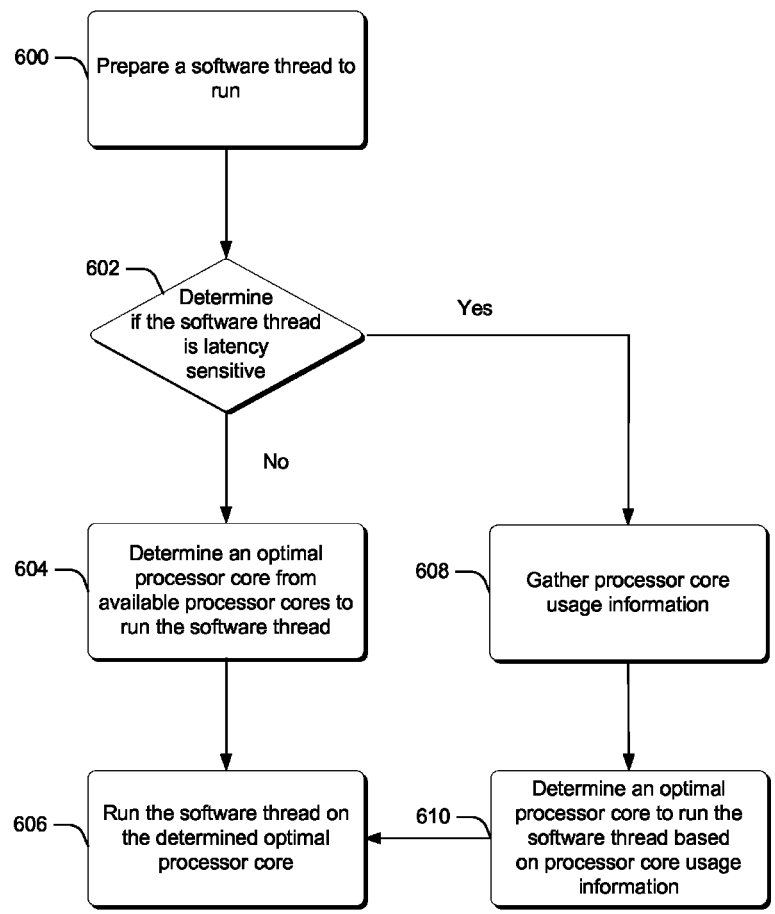
FIG. 6 illustrates a flow diagram in accordance with one or more embodiments.

As an additional example, consider FIG. 6, which illustrates a flow diagram that describes steps in a method in accordance with one or more embodiments. The method can be performed by any suitable hardware, software, firmware, or combination thereof. In at least some embodiments, aspects of the method can be implemented by one or more suitably configured software modules executing on one or more computing device, such as processor core loading module 112, of FIG. 1.

Step 600 prepares a software thread to run. Responsive to preparing a software thread to run, step 602 determines if the software thread is latency sensitive. This can be determined in any suitable manner, such as by analyzing a data stored in thread structure 308 described with FIG. 3.

Responsive to determining the software thread is not latency sensitive, step 604 determines a desired processor core from available processor cores to run the software thread. This can include choosing a desired processor based upon information gathered and/or stored in core data structure 310 of FIG. 2, choosing a desired processor core by choosing a currently running processor core, choosing a desired processor core based upon a pre-determined assignment, and so forth. Responsive to determining a desired processor core, step 606 runs the software thread on the determined processor core.

Responsive to determining the software thread is latency sensitive, step 608 gathers processor core usage information. In some embodiments, this entails accessing pre-gathered information stored in structures, such as processor core interrupt heavy state information as described above, and or executing one or more tasks to probe the system state. Alternately or additionally, this can include determining processing core percentage usage information.

Responsive to gathering the processor usage information, step 610 determines a desired processor core to run the software thread based on processor core usage information. Upon determining a desired processor core, the flow proceeds to step 606 and runs the software thread on the determined processor core.

Having considered a discussion of scheduling latency sensitive software interrupts and/or threads, consider now a discussion of an example device that can be utilized to implement the embodiments described above.

Example Device

Figure 7:
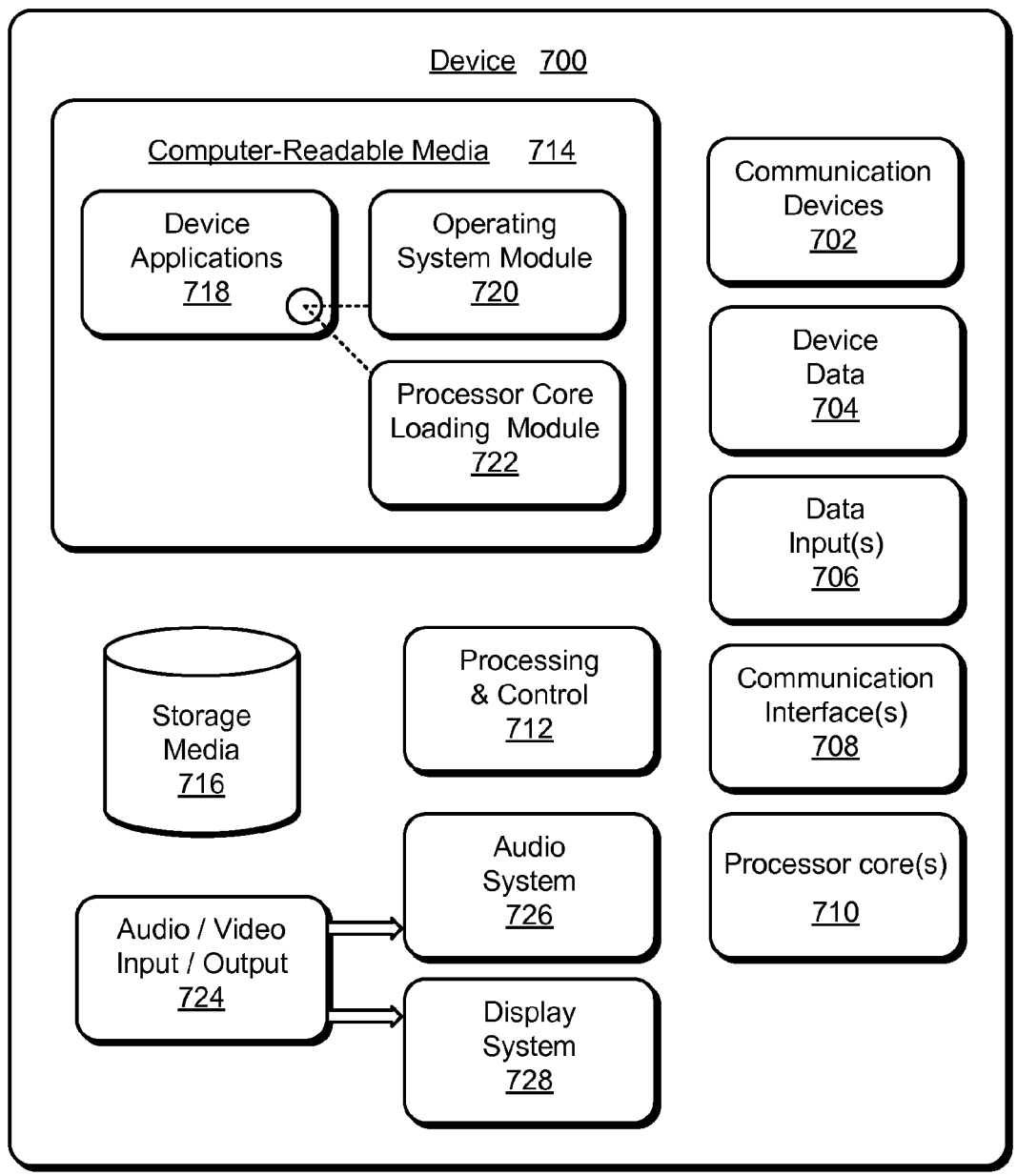
FIG. 7 illustrates an example computing device that can be utilized to implement various embodiments described herein.

FIG. 7 illustrates various components of an example device 700 that can be implemented as any type of portable and/or computer device as described with reference to FIG. 1 implement embodiments of the latency sensitive thread and/or interrupt scheduling techniques described herein. Device 700 includes communication devices 702 that enable wired and/or wireless communication of device data 704 (e.g., received data, data that is being received, data scheduled for broadcast, data packets of the data, etc.). The device data 704 or other device content can include configuration settings of the device, media content stored on the device, and/or information associated with a user of the device. Media content stored on device 704 can include any type of audio, video, and/or image data. Device 700 includes one or more data inputs 706 via which any type of data, media content, and/or inputs can be received, such as user-selectable inputs, messages, music, television media content, recorded video content, and any other type of audio, video, and/or image data received from any content and/or data source.

Device 700 also includes communication interfaces 708 that can be implemented as any one or more of a serial and/or parallel interface, a wireless interface, any type of network interface, a modem, and as any other type of communication interface. The communication interfaces 708 provide a connection and/or communication links between device 700 and a communication network by which other electronic, computing, and communication devices communicate data with device 700.

Device 700 includes one or more processor core(s) 710 (e.g., any of microprocessors, controllers, and the like) which process various computer-executable or readable instructions to control the operation of device 700 and to implement the embodiments described above. Alternatively or in addition, device 700 can be implemented with any one or combination of hardware, firmware, or fixed logic circuitry that is implemented in connection with processing and control circuits which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 also includes computer-readable media 714, such as one or more hardware memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 700 can also include a mass storage media device 716.

Computer-readable media 714 provides data storage mechanisms to store the device data 704, as well as various device applications 718 and any other types of information and/or data related to operational aspects of device 700. For example, an operating system module 720 can be maintained as a computer application with the computer-readable media 714 and executed on processor core(s) 710. The device applications 718 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 718 also include any system components or modules to implement embodiments of the techniques described herein. In this example, the device applications 718 additionally includes processor core loading module 722 that is shown as software modules and/or computer applications. Processor core loading module 722 is representative of software that is used (re)assign software interrupts and/or tasks to processor cores based upon characterizations of the processor cores, software interrupts, and/or tasks. Alternatively or in addition, processor core module 722 can be implemented as hardware, software, firmware, or any combination thereof.

Device 700 also includes an audio and/or video input-output system 724 that provides audio data to an audio system 726 and/or provides video data to a display system 728. The audio system 726 and/or the display system 728 can include any devices that process, display, and/or otherwise render audio, video, and image data. Video signals and audio signals can be communicated from device 700 to an audio device and/or to a display device via an RF (radio frequency) link, S-video link, composite video link, component video link, DVI (digital video interface), analog audio connection, or other similar communication link. In an embodiment, the audio system 726 and/or the display system 728 are implemented as external components to device 700. Alternatively, the audio system 726 and/or the display system 728 are implemented as integrated components of example device 700.

CONCLUSION

Various embodiments provide an ability to schedule latency-sensitive tasks based, at least in part, upon one or more processor cores usage metrics. Some embodiments gather information associated with whether one or more processor cores are in a heavily loaded state. Alternately or additionally, some embodiments gather information identifying latency-sensitive tasks. Task(s) can be (re)assigned to different processor core(s) for execution when it has been determined that an originally assigned processor core has exceeded a usage threshold.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method comprising:
receiving a software interrupt;
responsive to receiving the software interrupt, determining whether the software interrupt is latency sensitive;
responsive to determining the software interrupt is latency sensitive, determining whether a current processor core is interrupt heavy;
responsive to determining the current processor core is interrupt heavy and that the software interrupt is latency sensitive, determining a desired processor core other than the current processor core to run the software interrupt; and
responsive to determining the desired processor core other than the current processor core, executing the software interrupt on the desired processor core.

2. The method of claim 1 further comprising:
responsive to determining the current processor core is not interrupt heavy, executing the interrupt on the current processor core.

3. The method of claim 1, wherein the determining whether the software interrupt is latency sensitive further comprises analyzing a data structure associated with the software interrupt.

4. The method of claim 3, wherein the data structure is configured to include a latency-sensitive flag to indicate whether the software interrupt is latency-sensitive or not.

5. The method of claim 4, wherein the determining a current processor core is interrupt heavy comprises analyzing a second data structure.

6. The method of claim 1, wherein the determining a desired processor core other than the current processor core further comprises identifying a processor core less loaded than the current processor core.

7. The method of claim 1 further comprising:
identifying the desired processor core based, at least in part, on the desired processor core not being interrupt-heavy.

8. The method of claim 1, wherein the software interrupt is associated with an input device.

9. One or more computer readable storage devices embodying computer readable instructions which, when executed, implement a method comprising:
preparing a software thread to run;
determining whether the software thread is latency-sensitive;
responsive to determining the software thread is latency-sensitive, gathering processor core usage information;
determining a desired processor core to run the software thread based, at least in part, on the processor core usage information; and
responsive to determining the desired processor core, running the software thread on said determined processor core.

10. The one or more computer readable storage devices of claim 9, wherein the software thread comprises a software thread associated with a software application.

11. The one or more computer readable storage devices of claim 9, wherein the processor core usage information comprises a percentage of usage of the processor core.

12. The one or more computer readable storage devices of claim 9, wherein the gathering processor core usage information further comprises:
identifying whether a usage value associated with a current processor core has exceeded a usage threshold; and
responsive to identifying the usage value associated with the current processor core has exceeded the usage threshold, assigning the software thread to the desired processor core.

13. The one or more computer readable storage devices of claim 9, wherein the method further comprises:
responsive to determining the software thread is not latency-sensitive, executing the software thread on a pre-assigned processor core.

14. A system comprising:
one or more processor cores;
one or more computer-readable storage media associated with the one or more processor cores;
one or more processor core loading modules configured to:
identify whether a task is latency-sensitive or not;
identify one or more characteristics associated with the one or more processor cores; and
assign the task to a processor core with available resources based at least in part, on whether the task is latency-sensitive or not and based, at least in part, on the one or more characteristics associated with the one or more processor cores.

15. The system of claim 14, wherein the one or more processor core loading modules are further configured to:
periodically gather metrics associated with the one or more processor cores; and
update one or more data structures based, at least in part, on gathered metrics.

16. The system of claim 15, wherein the metrics comprise processor core usage percentages.

17. The system of claim 15, wherein the one or more processor core loading modules are further configured to periodically gather metrics based upon a clock tick associated with a processor core.

18. The system of claim 14, wherein the one or more processor core modules are further configured to reassign the task to a different processor core when an originally assigned processor core has been determined as being interrupt heavy.

19. The system of claim 14, wherein the one or more processor core modules are further configured to assign tasks to processor cores based, at least in part, on a total system metric goal associated with total processor usage.

20. The system of claim 14, wherein the task comprises a software interrupt.

* * * * *